United States Patent
Geiger et al.

(10) Patent No.: US 6,639,482 B2
(45) Date of Patent: *Oct. 28, 2003

(54) METHOD FOR REGULATING THE WORKING POINT OF A MODULATOR AND ASSOCIATED DRIVE UNIT

(75) Inventors: Harald Geiger, Neuried (DE); Georg Mohs, Munich (DE); Christoph Glingener, Feldkirchen-Westerham (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/960,881

(22) Filed: Sep. 21, 2001

(65) Prior Publication Data

US 2002/0047750 A1 Apr. 25, 2002

(30) Foreign Application Priority Data

Sep. 21, 2000 (DE) .......................... 100 46 898

(51) Int. Cl.$^7$ ................................................ H03K 7/00
(52) U.S. Cl. .................... 332/106; 332/109; 332/112; 359/237
(58) Field of Search ............................. 332/106, 109, 332/112; 359/237, 238, 239, 245, 246, 278

(56) References Cited

U.S. PATENT DOCUMENTS 6,278,539 B1 * 8/2001 Ooi et al. ................... 359/237
2002/0060614 A1 * 5/2002 Fuerst et al. ................ 332/106

* cited by examiner

*Primary Examiner*—Robert Pascal
*Assistant Examiner*—Kimberly E Glenn
(74) *Attorney, Agent, or Firm*—Bell, Boyd & Lloyd LLC (57) ABSTRACT

A method and drive unit for controlling a modulator (128) in which the working point of the modulator (128) is regulated using a regulating circuit (124) in such a way that the working point is stable in relation to the transmission characteristic curve of the modulator (128) for a long time and under different operating conditions.

19 Claims, 8 Drawing Sheets

METHOD FOR REGULATING THE WORKING POINT OF A MODULATOR AND ASSOCIATED DRIVE UNIT

BACKGROUND OF THE INVENTION

The invention relates to a method for regulating the working point of a modulator. The modulator generates a modulated output radiation, for example in the visual range, from an input radiation as a function of a control signal.

Stable pulse sources are required to generate pulses in optical telecommunication transmission networks. A simple and cost-effective method for generating pulses from what is referred to as a continuous-wave source using high-speed optical modulators is described in German patent document no 199 24 347.6. However, the long-term stability of the pulse source is a problem with this method. In order to avoid shifting of the working point, stable modulators, in which long-term stability is achieved by means of costly structural measures, have been used at low data rates. The same problems occur with data modulators.

SUMMARY OF THE INVENTION

The present invention pertains to a simple method for regulating the working point of a modulator which ensures a stable working point of the modulator. In addition, the present invention pertains to an associated drive unit.

The invention is based on the fact that the working point is an essential operating parameter of the modulator. If the working point changes, the pulses generated by the modulator also change. The working point can be set very precisely when a modulator is manufactured, but it then drifts as a function of various causes. Such causes are, for example, aging of the modulator over the years or an operating temperature which changes within minutes while the modulator is operating, for example directly after switching-on.

The invention is also based on the fact that the working point can be easily set with respect to the transmission characteristic curve of the modulator by means of the average value of the control signal or using an auxiliary signal which ultimately influences the average value of the control signal. Furthermore, the invention is based on the idea that a deviation of the actual working point from a predefined setpoint working point results in a change in the output radiation.

In a method according to the invention, the average radiant power is sensed from the output radiation in at least one predefined frequency range. The average radiant power is the radiant power averaged over the frequencies. Furthermore, a periodic deflection of the working point in accordance with a working point deflection frequency is forcibly brought about. A regulating signal is generated as a function of the deflection of the working point. The average value of the control signal and/or the signal value of the auxiliary signal are changed as a function of the regulating signal in such a way that the deviation between the actual working point and the setpoint working point becomes smaller.

As a result of this procedure, both short-term deviations of the actual working point from the setpoint working point and long-term deviations due to a change in the transmission characteristic curve of the modulator can easily be compensated for. The average radiant power is used as a regulated variable. The voltage or the current of the control signal is used as the manipulated variable.

As a result of the reference to a prominent point, the regulation can also be carried out without predefining a setpoint power. For example, a minimum value, a maximum value, an inflection or another point at which a derivative has the value zero can be selected in the power curve as the reference point.

The methods known from regulating technology are used as regulating methods, for example, a proportional, a proportional-integral or a proportional-integral-differential regulating method. The power sensed can, if appropriate, be used directly as a regulated variable. However, very good control circuits are obtained if the regulated variable is sensed using phase-sensitive detection, which is also known as a lock-in method. Phase-sensitive detection has the advantage that the regulation can be carried out comparatively independently of interference variables, for example of signal noise. Phase-sensitive detection is explained, for example, in the book "Electronic Measurement and Instrumentation", Klaas B. Klaassen, Cambridge University Press, 1996, pages 204 to 210.

In one embodiment, a derivative of the function of the working point and sensed power is used as the regulated variable. During the regulation operation, it is then possible to make reference to a point of the function at which the selected derivative has the value zero. Making reference here means that regulation is performed to the regulating point without detuning the control circuit.

The modulator is either a pulse modulator which is driven with a periodic control signal with a predetermined driving frequency, or a data modulator which is driven with a control signal which is dependent on the data to be transmitted, half the data rate being referred to as the driving frequency.

In an embodiment, the predefined frequency range contains all the frequencies of the frequencies of the output radiation which can be sensed by a transducer unit. For example a photodiode or a phototransistor is used as the transducer unit. The frequencies which can be sensed by the transducer unit are determined by its design. In addition to the transducer unit, no filters for filtering out specific frequency ranges are necessary in this embodiment. The predefined frequency range can have a very broad band, for example from 0 Hz to the gigahertz range. However, it is also possible to use transistor units which operate with a comparatively narrow band, sensing, for example, only frequencies from 0 Hz to the kilohertz range. Narrow-band transducer units can be manufactured more easily in comparison to broadband transducer units and can therefore be obtained more cost-effectively.

In another embodiment, the predefined frequency range contains only a portion of the frequencies of the output radiation which can be sensed by a transducer unit. This portion is determined by the design of a filter unit connected downstream of the transducer unit. The filter unit is, for example, a low-pass filter, a bandpass filter or a high-pass filter. In this development, changes which occur in the spectrum as a function of the working point are used. As a result of the selection of one or more suitable frequency ranges it is possible to obtain very large signal differences between the power in the setpoint working point and the power when there are deviations from the setpoint working point.

In one refinement of the method with a filter unit, the predefined frequency range includes a frequency which corresponds to the driving frequency. Twice the driving frequency and multiples of twice the driving frequency are not contained in the frequency range. The refinement is based on the fact that when there are deviations from the setpoint working point a considerable power increase occurs in the vicinity of the driving frequency in the power density spectrum. The power which can be sensed in the vicinity of the driving frequency is dependent on the magnitude of the deviation between the setpoint working point and actual working point.

If, in a further refinement of the method with a filter unit, in particular with a pulse modulator, the setpoint working point lies at a transmission maximum value—what is referred to as RZ (return to zero) mode—or at a transmission minimum value—what is referred to as carrier suppressed RZ mode—the average value of the control signal and/or the signal value of the auxiliary signal is regulated using a control circuit, which is adjusted, without detuning, to a regulating point at which the average power within the predefined frequency range is at a minimum.

In another embodiment, the predefined frequency range contains only frequencies which lie far below the driving frequency, i.e. are low frequency in comparison to the driving frequency. For example, the frequencies are smaller than a tenth of the driving frequency. The signals to be processed thus have lower frequencies. Components are used which are configured for limiting frequencies which lie far below the driving frequency. If the driving frequency lies, for example, in the gigahertz range, components for the kilohertz range are suitable for processing because these components still sense the average power required for the regulation. Circuits required for the method can therefore be constructed cost-effectively without high-frequency components.

If the setpoint working point is at a transmission minimum value in a refinement with a low frequency range—in particular in the case of a pulse modulator—the average value of the control signal and/or the signal value of the auxiliary signal is regulated using a control circuit which is adjusted to a regulating point at which the average power within the predefined frequency range is at a maximum.

If, on the other hand, the setpoint working point is at a transmission maximum value in an alternative refinement with a low frequency range—in particular in the case of a pulse modulator—the average value of the control signal and/or the signal value of the auxiliary signal is regulated using a control circuit which is adjusted to a regulating point at which the average power within the predefined frequency range is at a minimum.

If the setpoint working point lies between a transmission maximum value and a transmission minimum value of the transmission characteristic curve (what is referred to as clock RZ mode) in a further alternative refinement with a low frequency range—in particular in the case of a pulse modulator—a regulating point at which the average power is at a minimum value or at a maximum value is selected.

If the setpoint working point lies between a transmission maximum value and a transmission minimum value, preferably at an inflection, in a further alternative refinement with a low frequency range in the case of a data modulator, the average value of the control signal and/or the signal value of the auxiliary signal is regulated using a control circuit which is adjusted to a regulating point at which the function of the average power of the working point has an inflection.

In another embodiment, the control circuit for regulating the working point is not detuned, so that the control circuit is regulated to the regulating point at the setpoint working point of the modulator. In what is referred to as the clock RZ mode, the control circuit is detuned.

A regulated variable with a correct sign can be easily acquired in an embodiment if a small deviation of the working point is forcibly brought about for regulating purposes. The power is then sensed at least two different working points. Phase-sensitive detection, for example, is based on forcibly bringing about such small deviations of the working point in such a way, said detection also being referred to as a lock-in method, see, for example, Klaas B. Klaassen, "Electronic Measurement and Instrumentation", Cambridge University Press, 1996, pages 204 to 210.

In one refinement, for regulating purposes the deviation of the working point is forcibly brought about using a periodic deflection signal with a predefined deflection frequency. The deflection signal is preferably added to the control signal. A signal which is dependent on the sensed power is multiplied by a periodic reference signal whose frequency corresponds to the deflection frequency. A signal which results from the multiplication is used, after low-pass filtering and preferably after subsequent integration, to change the average value of the control signal and/or to change the signal value of the auxiliary signal. The limiting frequency of the low-pass filter determines the response time of the control circuit, which is, for example, between 10 milliseconds and 100 milliseconds. As a result of this method, the derivative of the power curve is ultimately used as a regulated variable. Depending on the phase of the deflection signal ($\pi/2$ or $3\pi/2$), the power can be regulated to a maximum value or a minimum value. The deflection signal has a cosine-shaped or sine-shaped profile. However, other deflection signals are also used, for example, signals with a square-wave profile. If the reference signal has a frequency which corresponds to a multiple of the deflection frequency, points can be detected at which higher derivatives are zero, for example an inflection at twice the deflection frequency.

At the same time as the working point, it is also possible to regulate the working range in a similar way. The deflection frequency for regulating the working point and the deflection frequency for regulating the working range are selected in such a way that the control circuits operate independently of one another. Thus, deflection frequencies which are different from one another are used, for example a deflection frequency of 3 kHz and a deflection frequency of 5 kHz.

The input radiation is generated in a pulse modulator or a data modulator using a continuous-wave light source or a pulsed radiation source. A pulse modulator forms a pulse light source, for example.

The driving frequency of the modulator is more than 1 gigahertz, preferably 5 gigahertz or 20 gigahertz, in some embodiments. In another embodiment, the modulator operates in the visual range. For example, the modulator contains a Mach-Zehnder interferometer. The transmission characteristic carve of the modulator is, for example, cosine-shaped or sine-shaped. However, modulators with other transmission characteristic curves are also used.

The invention also relates to a drive unit for carrying out the above mentioned methods. The technical effects which have been mentioned for the methods also apply to the drive unit and its embodiments.

Additional features and advantages of the present invention are described in, and will be apparent from, the following Detailed Description of the Invention and the figures

DETAILED DESCRIPTION OF THE INVENTION

Figure 1:
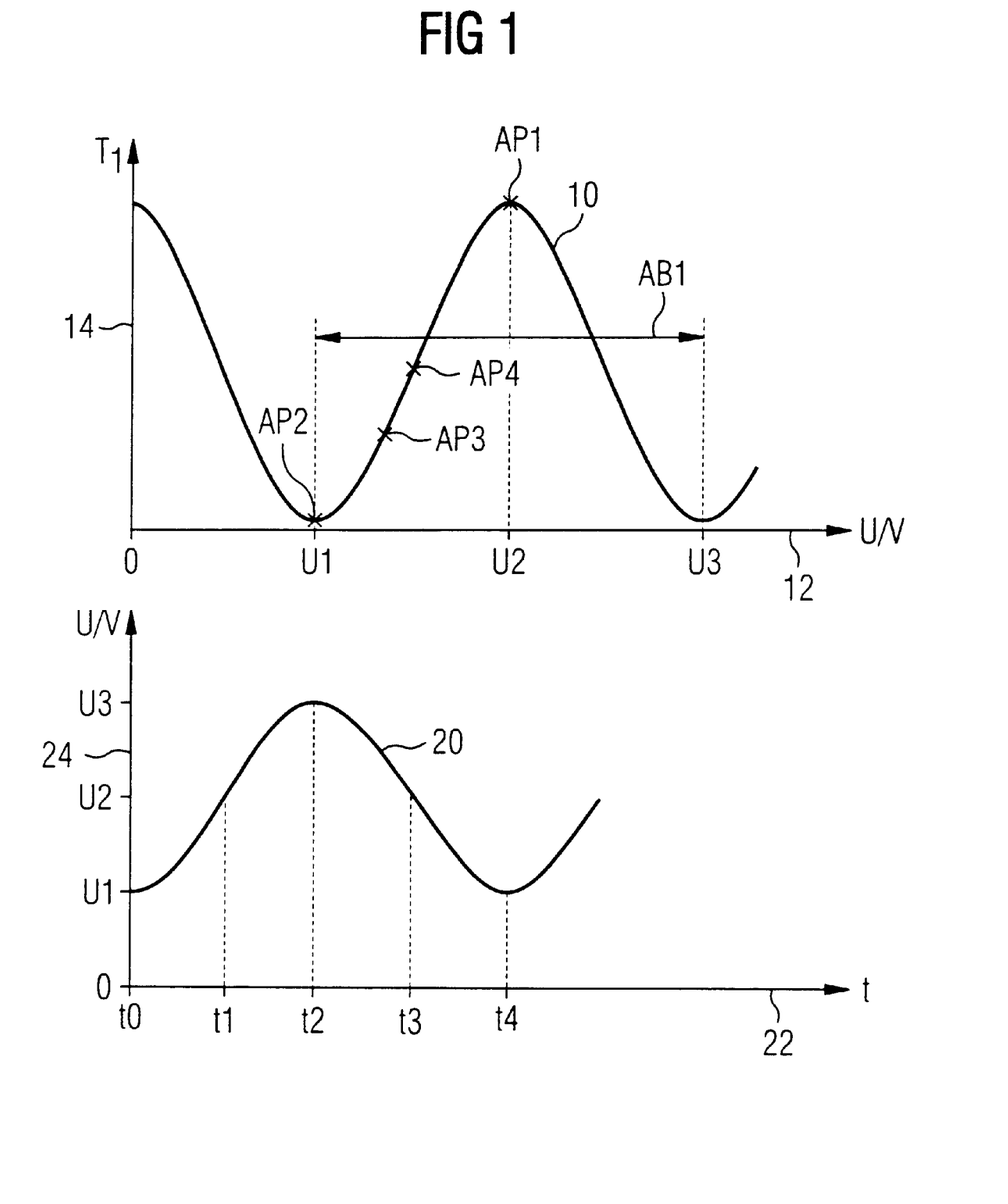
FIG. 1 shows a transmission characteristic curve of a pulse modulator with input radiation which is constant over time, and the profile of a control signal.

FIG. 1 shows in its upper part a transmission characteristic curve 10 of a modulator, for example, a pulse modulator, with input radiation which is constant over time. The driving current is plotted in volts on an abscissa axis 12. An ordinate axis 14 shows transmission values T. The transmission characteristic curve 10 has a cosine-like profile starting at the voltage 0 volts. The transmission drops from a maximum value 1 to virtually 0 at a voltage U1. A working point AP2 lying at a transmission minimum value is associated with the voltage U1. As the voltage increases, the transmission T increases until at a voltage U2 a working point AP1 is reached which lies at a maximum value of the transmission characteristic curve 10. If the voltage is increased further, the transmission drops, and a minimum value is reached again at a voltage U3.

The working point AP1 at the transmission maximum value is also referred to as the RZ (return to zero) working point. In the RZ mode, the working point AP1 should always lie at the transmission maximum. If the transmission characteristic curve 10 of the pulse modulator changes, it is necessary to readjust the working point AP1 by changing the voltage U2. As aging of the pulse modulator occurs, the transmission characteristic curve 10 is compressed, stretched or displaced in the direction of the abscissa axis 12 and/or in the direction of the ordinate axis 14. If the pulse modulator is operated at the working point AP1, an optimum working range AB1 lies precisely between the voltages U1 and U3.

However, the modulator can also be operated at the working point AP2 at which the driving voltage fluctuates about the voltage U1. This mode of operation is referred to as operation with suppressed carrier because no spectral line occurs at the carrier frequency, i.e. at the frequency of the input radiation, in the optical frequency spectrum of the output radiation. The optimum working range at the working point AP2 lies between the voltage 0 volts and the voltage U2.

However, the pulse modulator can also be operated at a working point AP3 which lies between the two working points AP1 and AP2. In the exemplary embodiment, the working point AP3 lies below the inflection of the transmission characteristic curve 10 in the vicinity of the working point AP2. The optimum working range for the working point AP3 lies symmetrically around this working point AP3 between the voltage U1 and a lower voltage than the voltage U2.

In the lower part of FIG. 1, the voltage profile of a control signal 20 is illustrated as a function of the time t plotted on the abscissa axis 22. An ordinate axis 24 is used to represent the voltage values U in volts.

The control signal 20 is used to drive the pulse modulator at the working point AP1. At a time t0, the control signal 20 has the voltage U1 so that the modulator only transmits a minimum output radiation. At a later time t1, the control signal has the voltage U2. This means that the modulator transmits the input radiation almost unimpeded. A light pulse appears at the output of the modulator. At a time t2, the control signal has the voltage U3 so that the modulator operates at a transmission minimum value again and essentially transmits no light. At a time t3, the control signal has the voltage value U2 again, with the result that a second light pulse is generated. At a later time t4, the control signal 20 has the voltage value U1 again, so that no radiation passes to the output of the modulator. During a period of the control signal 20, two light pulses are therefore emitted.

The average value of the sine-shaped control signal 20 determines the working point, see voltage U2. The amplitude of the control signal 20 determines the working range AB1, see the difference between the voltages U3 and U1.

Figure 2:
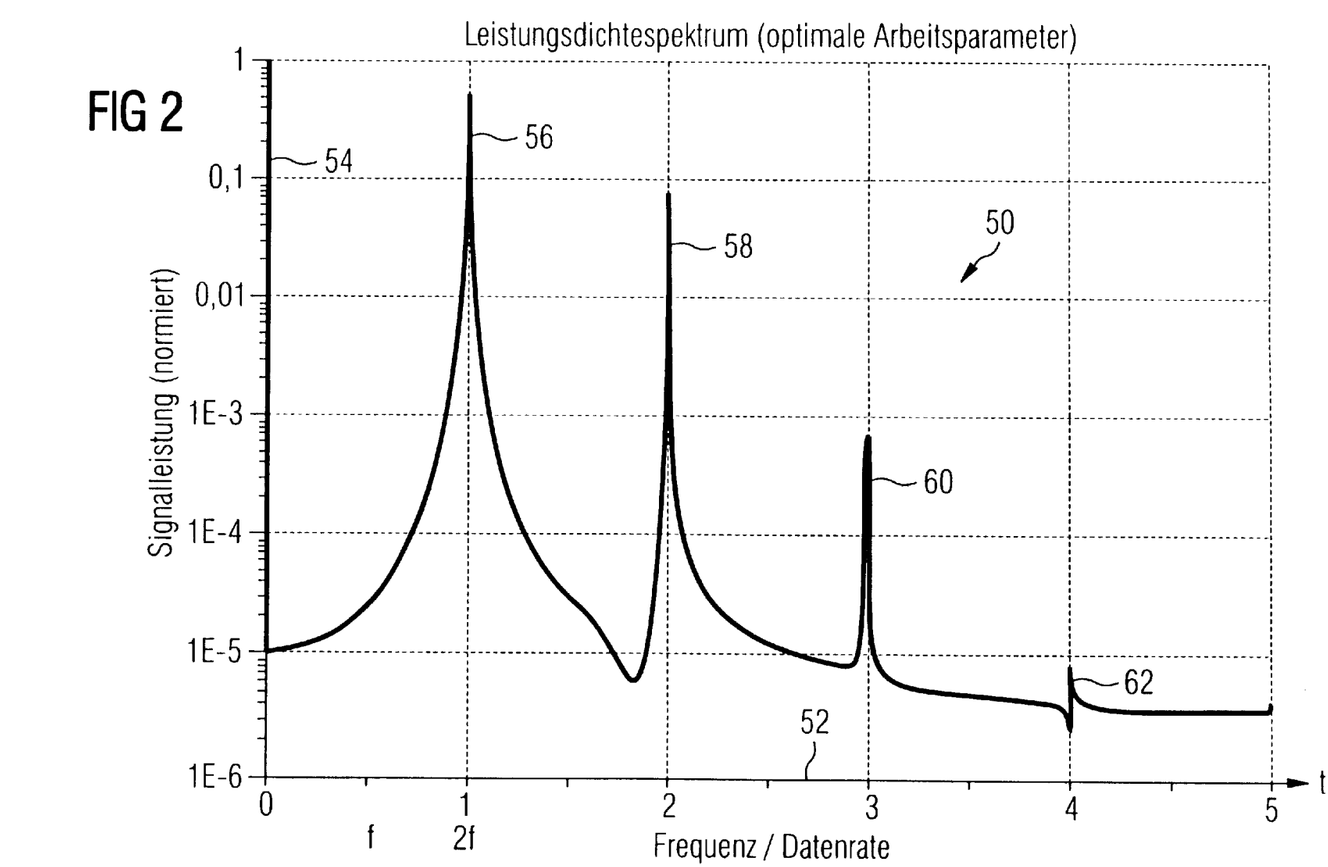
FIG. 2 shows the power density spectrum of the output radiation of the pulse modulator given optimum working parameters.

FIG. 2 shows the power density spectrum 50 of the output radiation of the pulse modulator at the optimum working point AP1 and optimum working range AB1, see the upper part of FIG. 1. The frequency related to the data rate is plotted on an abscissa axis 52. In the exemplary embodiment, the data rate 10 is in gigahertz and the control signal has a driving frequency of 5 gigahertz. The signal power sensed using a photodiode and a spectrum analyzer is plotted on a logarithmic scale on an ordinate axis 54. The signal power has been standardized.

The power density spectrum 50 shows four power peaks 56 to 62 at the frequency/data rate values 1, 2, 3 and 4. The peak values of the power peaks 56, 58, 60 and 62 lie at approximately 0.6; 0.08; 0.0007 and at $8 \times 10^{-6}$ in this sequence.

Figure 3:
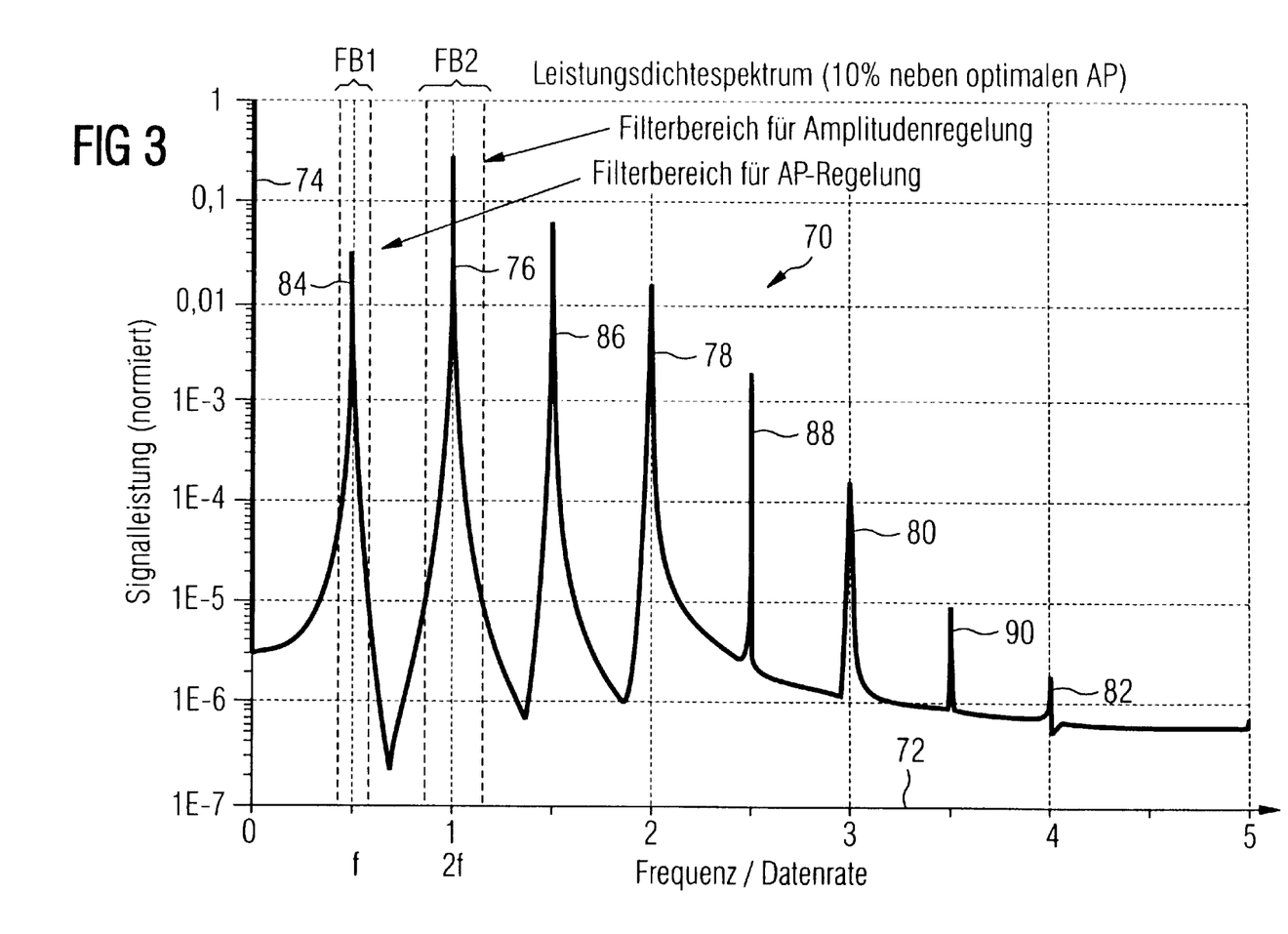
FIG. 3 shows the power density spectrum of the output radiation of the pulse modulator given a deviation of the actual working point by 10 percent and the setpoint working range.

FIG. 3 shows the power density spectrum 70 of the output radiation of the pulse modulator given a deviation of the actual working point from the setpoint working point AP1 of 10 percent. The working range AB is correspondingly displaced, but has an unchanged width. An abscissa axis 72 shows the ratio of the frequency to the data rate, in the same way as the abscissa axis 52 of FIG. 2. An ordinate axis 74 shows the standardized radiant power in a logarithmic representation. Power peaks 76 to 82 lie at the same frequencies as the power peaks 56 to 62 in this sequence, see FIG. 2. The peak values of the power peaks 76, 78 and 80 lie considerably below the peak values of the power peaks 56, 78 and 80. Given deviations from the optimum working point, further power peaks 84, 86, 88 and 90 occur at the driving frequency and between the power peaks 76, 78, 80 and 82. The power peak 84 has a peak value of approximately 0.03 which lies below the peak value 0.25 of the power peak 76. The peak values of the power peaks 86, 88 and 90 each lie approximately between the peak values of the respective adjacent power peaks 76, 78, 80 and 82.

The change in the power density spectrum 50 to the power density spectrum 70, apparent from FIGS. 2 and 3, given deviations from the working point, can be used to regulate the working point of the pulse modulator. In particular the occurrence of the power peak 84 at the driving frequency which is 5 gigahertz in the exemplary embodiment is used to regulate the working point. The objective is to minimize the peak value of this power peak. A frequency range FB1 surrounding the power peak 84 has a width of approximately 0.3×f, f being the driving frequency. The frequency range FB1 is centered around the driving frequency f. During the regulation of the working point using HF components (high frequency), only the power peak 84 is used within the frequency range FB1.

The power density spectrum of the output radiation is also used to regulate the working range AB. FIG. 3 illustrates a frequency range FB2 which surrounds the power peak 76 and which contains the frequencies used to regulate the working range. The frequency range FB2 has a width of approximately 0.3×2f, f being the driving frequency. When deviations of the working range from the setpoint working range occur, the peak value of the power peak 76 lying in the frequency range FB3 drops.

Figure 4:
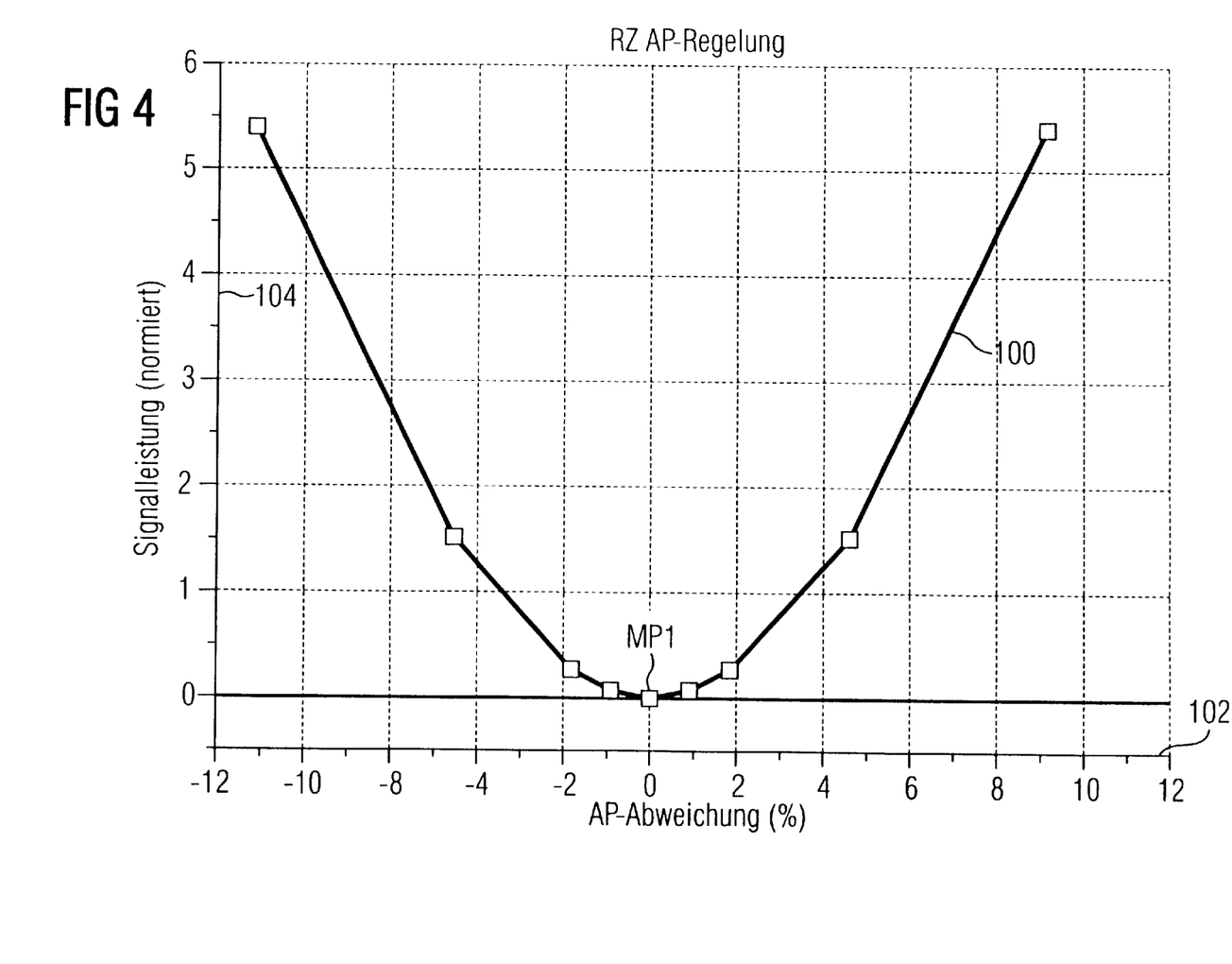
FIG. 4 shows the average HF radiant power of the pulse modulator in a predefined frequency range as a function of the working point deviation between the actual working point and the setpoint working point.

FIG. 4 shows the average HF radiant power in the frequency range FB1 as a function of the working point deviation between the setpoint working point AP1 and the actual working point, see FIG. 1. The relationship is illustrated by a power function 100 with parabola-like profile in accordance with a function f(APD), APD being the working point deviation. The working point deviation is plotted as a percentage on an abscissa axis 102. An ordinate axis 104 discloses values for the radiant power. The radiant power has been standardized to a power which occurs at approximately −4 percent or +4 percent deviation of the actual working point from the setpoint working point. If the actual working point and the setpoint working point correspond, the signal power has the minimum value, see measuring point MP1. As the deviation increases, the signal power increases continuously in both deviation directions. The objective of the regulation of the working point is therefore to minimize the radiant power within the frequency range FB1, i.e. to set it to the minimum value. The derivation of the power function 100 is suitable as the regulated variable. A regulating circuit which utilizes the relationships explained with reference to FIG. 4 is explained in more detail below with reference to FIG. 5.

Figure 5:
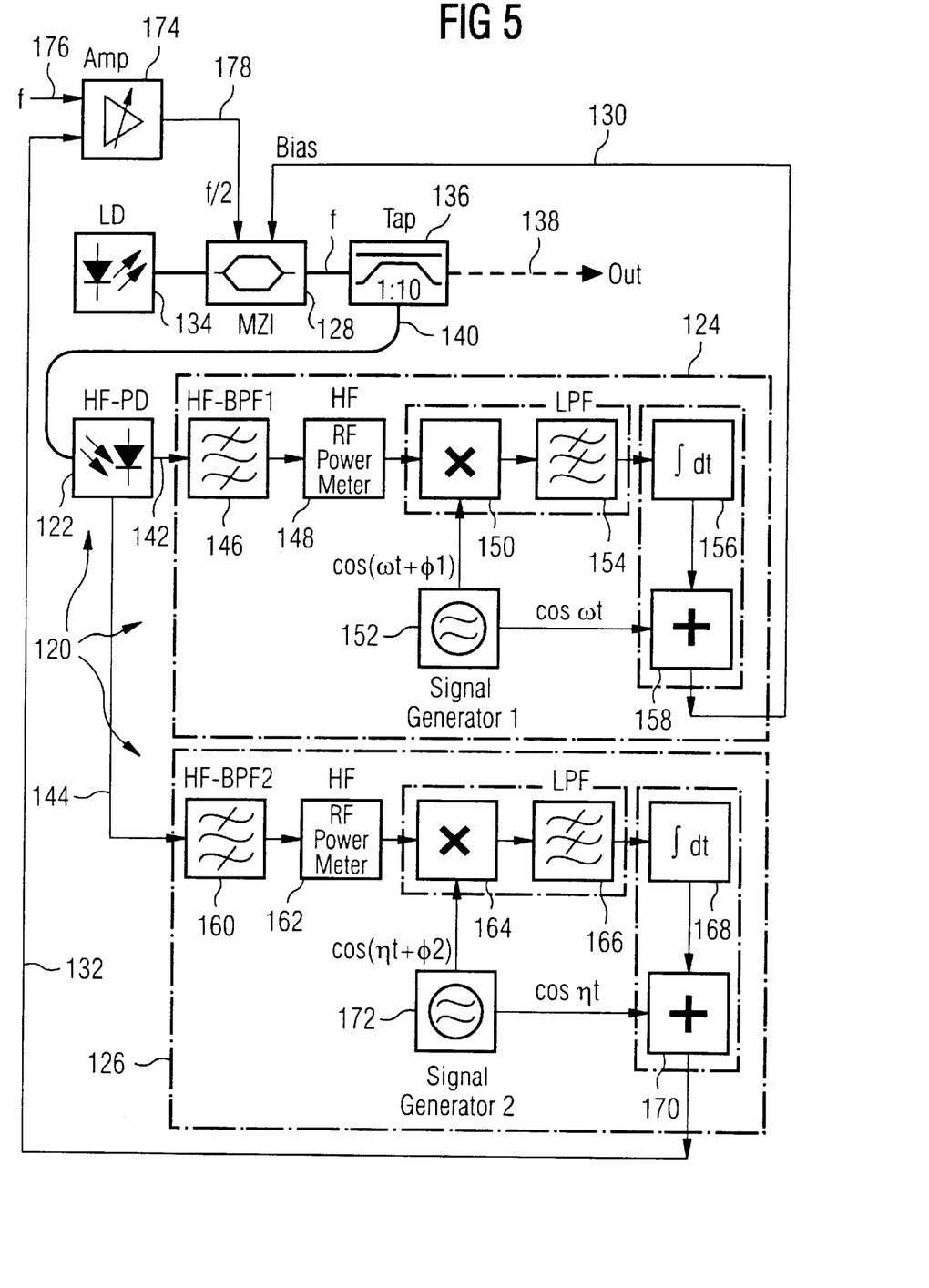
FIG. 5 shows a block circuit diagram for a drive unit of the pulse modulator containing HF components.

FIG. 5 shows a block circuit diagram for a drive unit 120 containing HF components, a photodiode 122, a working point regulating circuit 124 and a working range regulating circuit 126. The drive unit 120 is used to drive a pulse modulator 128 which contains what is referred to as a Mach-Zehnder interferometer (MZI) and has the transmission characteristic curve 10, see FIG. 1. The modulator 128 modulates the radiation generated by a laser diode 134, as a function of a working point regulating voltage 130, generated by the working point regulating circuit 124, and as a function of a working range regulating voltage 132 generated by the working range regulating circuit 126. The laser diode 134 operates in the continuous-wave mode (cw—continuous wave), so that the input radiation of the modulator 128 has a constant radiant power.

The modulated output radiation is divided with a ratio of 1:10 at a radiation splitter 136. The greater part of the modulated radiation is fed to a data modulator (not illustrated) which modulates the output radiation in accordance with data to be transmitted, see arrow 138. The smaller part of the output radiation is transmitted to the photodiode 122 by the radiation splitter 136 using an optical waveguide 140.

The photodiode 120 has a limiting frequency lying in the gigahertz range and is thus a high-frequency diode. The current flowing across the photodiode 122 depends on the radiation striking the photodiode 122. The current signal which is dependent on the radiation or a voltage signal acquired therefrom is used as the input signal for the working point regulating circuit 124 and as the input signal for the working range regulating circuit 126, see arrows 142 and 144.

The working point regulating circuit 124 contains a high-frequency bandpass filter 146 at whose input there is the signal coming from the photodiode 122. The bandpass filter 146 transmits essentially only signals with frequencies which lie within the frequency range FB1. Signals with frequencies which lie outside the frequency range FB1 are heavily damped. A high-frequency power meter 148 is connected downstream of the bandpass filter 146. The power meter 148 contains a rectifier diode with a limiting frequency lying in the high-frequency range. A signal whose value depends on the radiant power within the frequency range FB1 is output at the output of the power meter 148. This signal is multiplied, in a multiplication unit 150, by a reference signal which is generated by a signal generator 152. The following applies to the voltage $u_r(t)$ of the reference signal:

$$u_r(t) = \underline{u}_r \cdot \cos(\omega t + \phi 1) \tag{1},$$

$u_r(t)$ being the instantaneous value of the voltage of the reference signal as a function of the time t, $\underline{u}_r$ being the maximum value of the voltage of the reference signal, ω being a reference angular frequency and φ1 being an adjustable phase. The reference angular frequency ω is 2π times the deflection frequency for the working point.

The voltage $u_i$ of the input signal for the multiplication unit 150 which is output by the power meter 148 can be described by the following formula:

$$u_i(t) = f(x_0 + \underline{u}0 \cdot \cos(\omega \cdot t)) \tag{2},$$

$u_i$ designating the instantaneous value of the input signal as a function of the time, $x_0$ designating the working point, $\underline{u}0$ designating the maximum value of the forced deflection around the actual working point, ω designating the reference frequency and f( . . . ) designating the function illustrated in FIG. 4.

The multiplication unit 150 generates an output signal which, in addition to portions with multiples of the reference frequency ω, also contains a DC element. The DC element is a measure of the derivative of the function illustrated in FIG. 4 and is filtered out using a low-pass filter 154 and transmitted to an integrator unit 156. Signal elements with the reference frequency ω and signal elements with a frequency which corresponds to a multiple of the reference frequency ω are heavily damped by the low-pass filter 154 and thus do not arrive at the integrator unit 156. The integrator unit 156 integrates the signal present at its input over time and thus supplies the integrator element for regulation. At the output end, the integrator unit 156 is connected to one of the inputs of a summing element 158. The other input of the summing element 158 is connected to an output of the signal generator 152 at which a deflection signal is present, the value of which deflection signal changes in accordance with a cosine function with the reference frequency ω. The output of the summing element 158 also forms the output of the working point regulating circuit 124.

By setting the phase φ1 it is possible to cause the working point regulating circuit 124 to drive the pulse modulator 128 in such a way that the radiant power within the filter range FB1 is minimized, and the actual working point is thus regulated to the setpoint working point at the transmission maximum value. The reference frequency ω is suitably selected and lies, for example, in the kilohertz range.

The working range regulating circuit 126 is essentially of the same design, and thus also has the same function, as the working point regulating circuit 124. The working range regulating circuit 126 thus contains, in the sequence from the input to the output, a bandpass filter 160, a power meter 162, a multiplication unit 164, a low-pass filter 166, an integrator unit 168 and a summing element 170. The bandpass filter 160 transmits only signals with a frequency lying within the frequency range FB2. Furthermore, the working range regulating circuit 126 contains a signal generator 172 which generates a reference signal which changes in accordance with the function $\cos(\eta t+\phi 2)$, η being a reference angular frequency which differs from the reference frequency ω. The reference angular frequency η is 2π times the deflection frequency for the working range. φ2 is an adjustable phase of the signal. The signal generator also generates a further deflection signal which changes in accordance with the function cos vt. This deflection signal is applied to the other input of the summing element 170.

The output of the summing element 170 is simultaneously the output of the working range regulating circuit 126 which generates the working range regulating voltage 132. This regulating voltage 132 is used to adjust the gain of an amplifier 174. An input signal 176 with a sine-shaped profile and the driving frequency is present at the input of the amplifier 174. An output signal 178 of the amplifier 174 corresponds, even as far as the average value, with the control signal 20 and is used to drive the pulse modulator 128.

Furthermore, the amplifier 174 has an output (not illustrated) at which a voltage which is proportional to the output power of the amplifier is output. This voltage is used to detune the working range regulating circuit 126 by subtracting the voltage from the signal within the control loop using a subtractor element (not illustrated) between the low-pass filter 166 and integrator element 168, see also FIG. 7.

By suitably selecting the phase φ2, it is possible to ensure that the working range regulating circuit regulates the radiant power within the frequency range FB2 to a maximum value. At the same time, the amplitude of the control signal 20 is thus regulated in such a way that the actual working range corresponds to the setpoint working range AB1.

By suitably selecting the reference frequencies ω and v it is possible to ensure that the regulation of the working point operates independently of the regulation of the working range, and on the other hand that the regulation of the working range also operates independently of the regulation of the working point. Suitable values are, for example, 3 kHz and 5 kHz for the reference frequency ω and the reference frequency v, respectively.

Figure 6:
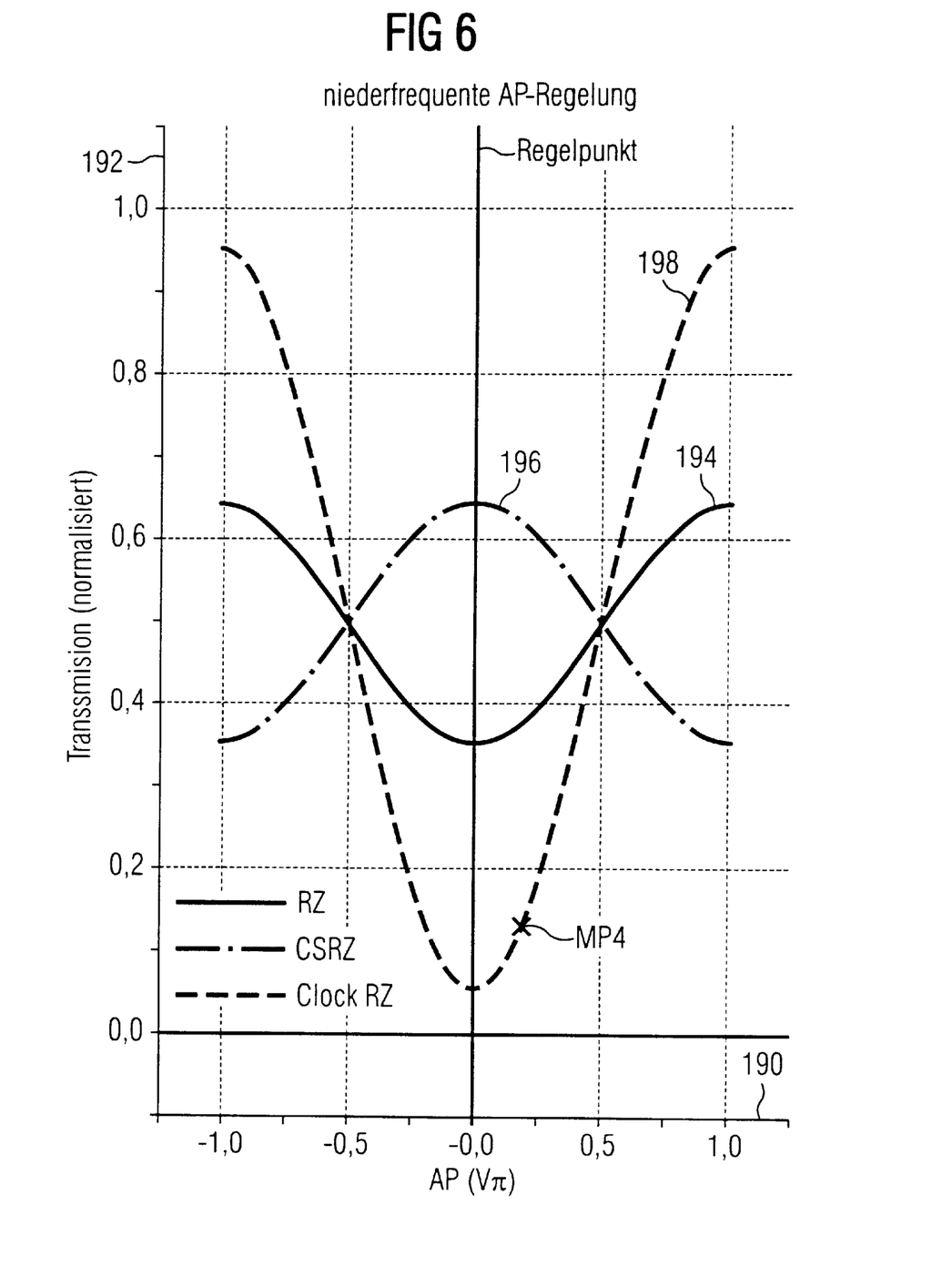
FIG. 6 shows the average LF radiant power of the pulse modulator as a function of the working point deviation.

FIG. 6 shows the average LF radiant power as a function of the working point position which is illustrated on an abscissa axis 190. The variable Vπ is used as a unit, i.e. the voltage which is required to displace the working point in the radiant direction on the transmission characteristic curve 10 by 180° or π. An ordinate axis 192 shows the standardized radiant power in the low frequency range which is emitted by the pulse modulator.

A continuous RZ characteristic curve 194 applies to a working point lying at the transmission maximum value of the characteristic curve 10, for example to the working point AP1. When the actual working point and the setpoint working point correspond, the characteristic curve 194 has a minimum value which is suitable for regulating the working point as a regulating point.

A dashed CSRZ (Carrier Suppressed Return to Zero) characteristic curve 196 applies to a setpoint working point at the transmission minimum value of the characteristic curve 10, for example to the working point AP2, see FIG. 1. When the actual working point and the setpoint working point correspond, the characteristic curve 196 has a transmission maximum value which is suitable for regulating the working point.

A characteristic curve 198 which is represented by a dotted line applies to the operation of the pulse modulator at a working point which lies between a transmission maximum value and a transmission minimum value, for example to the working point AP3, see FIG. 1. This operation is also referred to as clock RZ mode. The characteristic curve 198 has a transmission minimum value which is suitable for regulating the working point in the clock RZ mode. However, the associated control circuit is to be detuned in such a way that the setpoint working point is regulated. At the setpoint working point, the average radiant power is then near to the minimum value, see measuring point MP4.

Three circuits which are suitable for regulating the working point, in each case, one of the three operating modes of the modulator, are described below with reference to FIG. 7.

Figure 7:
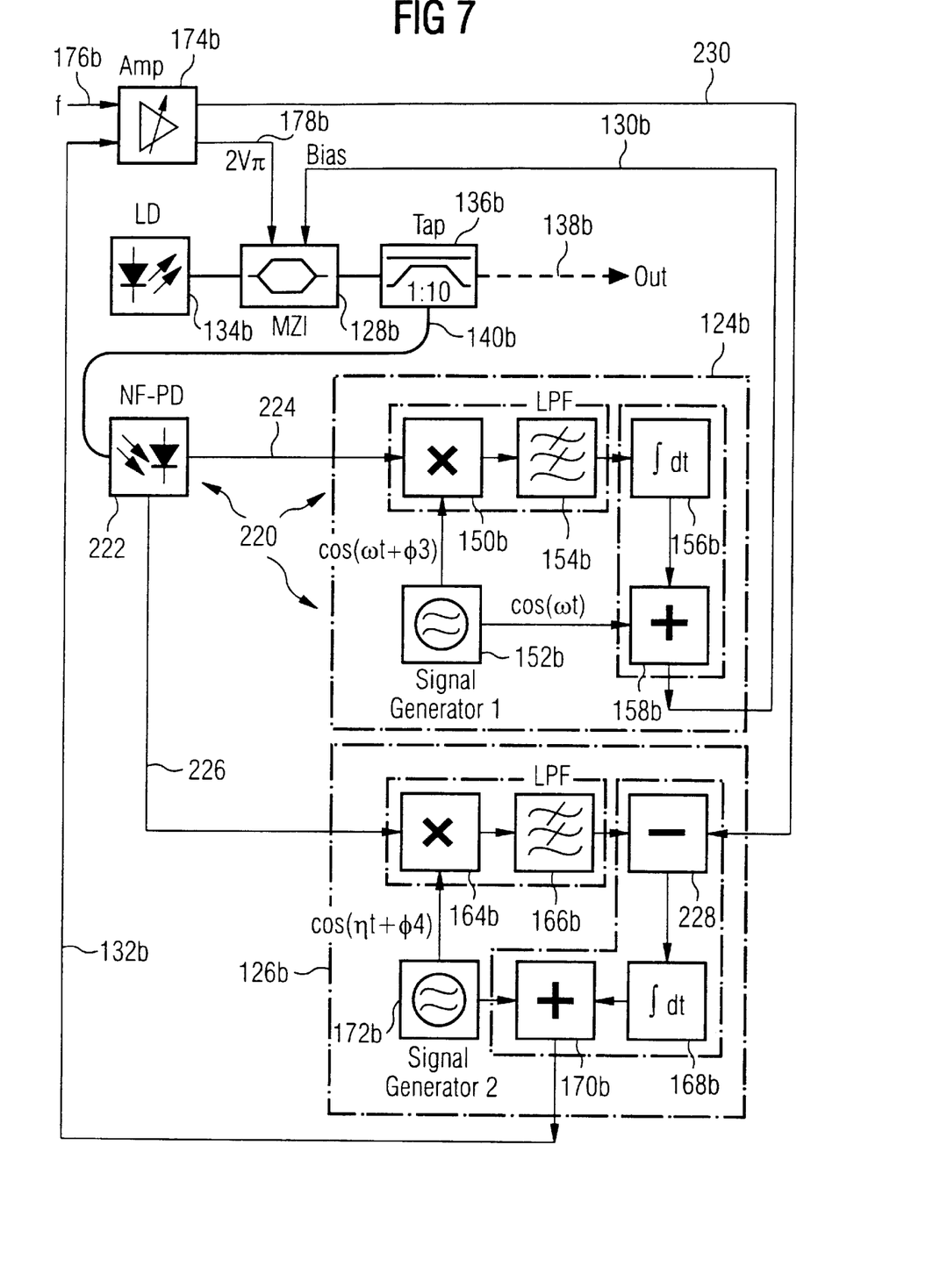
FIG. 7 shows a block circuit diagram for a drive unit, operating at low frequency, of a pulse modulator according to a second exemplary embodiment.

FIG. 7 shows a block circuit diagram for a low-frequency drive unit 220 of a pulse modulator 128b, which also has the transmission characteristic curve 10, see FIG. 1. The essential difference between the drive unit 220 and the drive unit 120, see FIG. 6, is that the drive unit 220 does not contain any high-frequency components. Otherwise, the design of the drive units 120 and 220 is the same so that circuit modules with the same design and same function are designated by the same reference symbols, but a "b" is placed after them in order to distinguish them. This applies in particular to reference symbols 124b to 140b. Instead of the HF photodiode 122, a photodiode 222 which has a limiting frequency lying in the LF range, for example a limiting frequency of 10 kHz, is used in the drive unit 220. The deflection frequency lies within the bandwidth of the photodiode 222. The current flowing through the LF photodiode 222 changes as a function of the output radiation impinging on the photodiode 222. In this case, only the low-frequency elements of the output radiation result in a change in the diode current. The photodiode 222 also averages over frequencies which lie above the frequency range sensed by it. The diode current or a voltage derived therefrom is used as input variable for the working range regulating circuit 124b and as input variable for the working range regulating circuit 126b, see arrows 224 and 226.

The working point regulating circuit 124b contains, from its input to its output, a multiplication unit 150b, a low-pass filter 154b, an integrator unit 156b and a summing element 158b. In addition, the regulating circuit 124 contains a signal generator 152b which in turn generates a reference signal and a deflection signal. The reference signal changes in accordance with the function $\cos(\omega t+\phi 3)$. The deflection signal changes in accordance with the function cos ωt.

The working range regulating circuit 126b contains, from the input to the output, a multiplication unit 164b, a low-pass filter 166b, a subtractor element 228, an integrator 168b and an adder element 170b. In addition, the regulating circuit 126b contains a signal generator 172b which generates a reference signal and a deflection signal. The reference signal changes in accordance with the function $\cos(vt+\phi 4)$. The deflection signal changes in accordance with the function cos vt. The output of the working range regulating circuit 126b is connected to the control input of an amplifier 174b. An input signal 176b which has a sine-shaped profile with the driving frequency is present at the amplifier 174b. An output signal 178b is used to drive the modulator 128b and corresponds to the control signal 20 as far as the average value, see FIG. 1. In addition, the amplifier 174b generates a detuning signal 230 whose signal value changes as a function of the average output power of the amplifier 174b. The detuning signal 230 is present at a further input of the subtractor element 228 and is used to detune the regulating circuit 126b for regulating the working range.

If the modulator 128b is operated at the working point AP1, see FIG. 1, the phase φ3 is set in such a way that the working point regulating circuit 124b regulates the emitted power to a minimum value, see FIG. 6, characteristic curve 194. This results in the working point being regulated to the transmission maximum value. The phase φ4 is selected in such a way that, due to the detuning of the control circuit, the working range regulating circuit 126b regulates the power of the output radiation in the low-frequency limiting range to a point lying near to a regulating point with a minimum transmission. As a result of this, the amplitude of the control signal is regulated to the value 2Vπ.

The deflection frequencies ω and ν are different from one another, for example 3 kHz and 5 kHz.

In a further exemplary embodiment, the modulator 128b is operated at the working point AP2, i.e. at the transmission minimum. The phase φ3 of the working point regulating circuit 124b is set in such a way that the output radiation transmitted in the low-frequency range by the modulator 128b assumes a maximum value, see FIG. 6, characteristic curve 196. The phase φ4 is selected in such a way that the output radiation of the modulator 128 is maximized but lies somewhat outside the maximum value owing to the detuning when the control circuit is adjusted.

If, in a further exemplary embodiment, the modulator 128b is operated at the working point AP3, see FIG. 1, the phase φ3 is set in such a way that the working point regulating circuit 124b minimizes the power in the low-frequency range of the output radiation of the modulator 128b and is regulated to a value lying quite close to the minimum value, due to the detuning, see FIG. 6, characteristic curve 198. As a result, the working point is also regulated to the setpoint working point AP3. The phase φ4 is selected in the operating mode of the working point AP3 in such a way that the working range regulating circuit 126b also minimizes the average power of the output radiation of the modulator 128b in the low-frequency range. However, the detuning of the regulating circuit 126b causes the working range to be regulated to a significantly lower value than 2Vπ.

Figure 8:
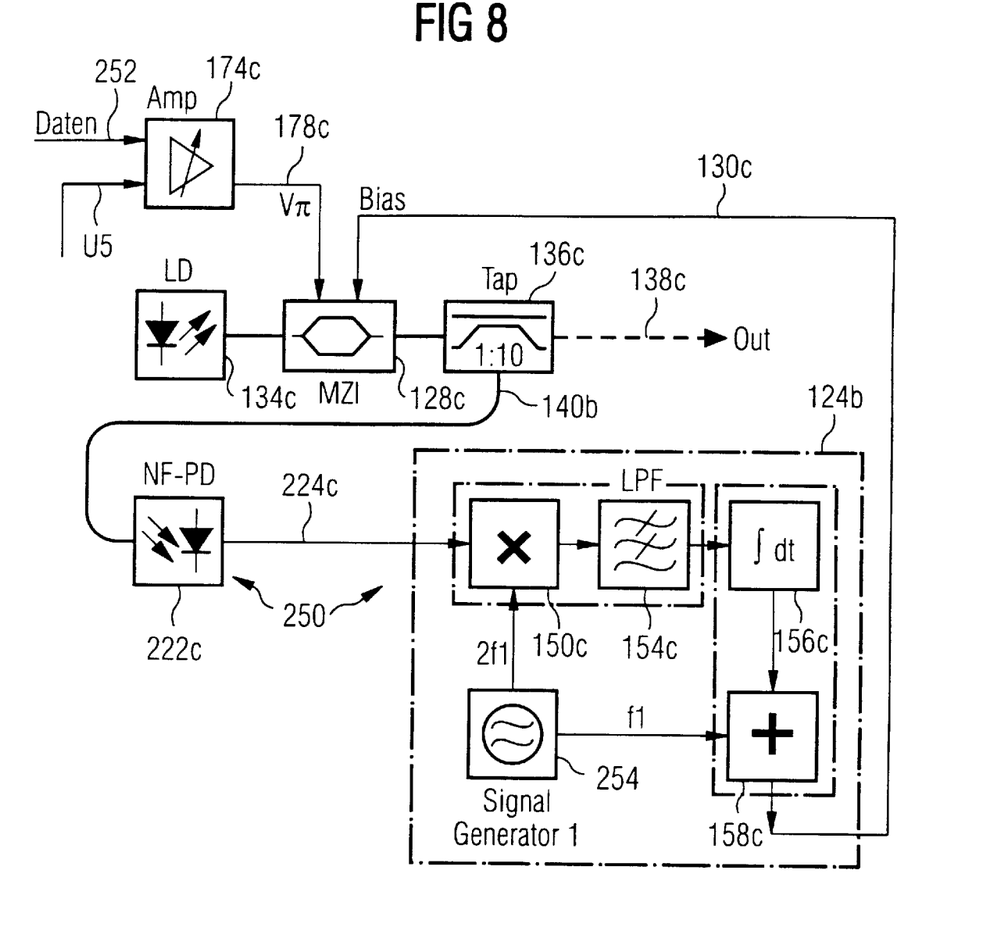
FIG. 8 shows a block circuit diagram of a drive unit, operating at low frequency, of a data modulator.

FIG. 8 shows a block circuit diagram of a low-frequency drive unit 250 of a data modulator 128c, which also has the transmission characteristic curve 10, see FIG. 1. The setpoint working point of the data modulator 128c lies at an inflection of the transmission characteristic curve, see working point AP4 in FIG. 1. The working range is Vπ and lies symmetrically around the working point AP4. A further difference between the drive unit 250 and the drive unit 220, see FIG. 7, is that the drive unit 250 only regulates the working point. The working range is not regulated because it remains virtually unchanged over the years, or because deviations of the working range are not so serious for the data modulator 128c. However, a voltage value U5 can be changed in order to set the working range. Furthermore, instead of the input signal 176b, an input signal 252 which is dependent on data is used. The maximum data rate is 10 GHz. Otherwise, the drive units 250 and 220 are of identical design so that circuit modules with the same design and same function are designated by the same reference symbols, but, instead of the "b" a "c" is placed after them in order to distinguish them. This applies in particular to reference symbols 124c, 128c, 130c, 134c to 140c, 150c, 154c to 158c, 174c and 178c. A photodiode 222c is of the same design as the photodiode 222, and an arrow 224c corresponds to the arrow 224.

Instead of the signal generator 152b, a signal generator 254 is used which generates a cosine-shaped deflection signal with a deflection frequency f1. For the multiplication in the multiplication unit 150c, the signal generator 254 generates a reference signal with twice the deflection frequency f1. This measure results at the output of the low-pass filter 154c in a DC element which corresponds to twice the derivative of the power function. The DC element is used to regulate with respect to the inflection. The phase of the signal generated by the signal generator 254 is to be set in such a way that it is regulated to the inflection.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method for regulating the working point of a modulator which generates a modulated output radiation from an input radiation as a function of a control signal, the method comprising the steps of:

sensing an average radiant power from the output radiation in at least one predefined frequency range;

forcing a periodic deflection of the working point with a working point deflection frequency;

generating a working point regulating signal as a function of the deflection of the working point;

changing an average value of the control signal as a function of the regulating signal; and regulating a derivative of the function of the deflection of the working point and a sensed capacity as a regulated variable, reference being made to a point of the function at which the derivative has a value zero.

2. The method as claimed in claim 1, wherein the modulator is one of a pulse modulator driven with a periodic control signal with a predefined driving frequency, and a data modulator driven with a control signal which is dependent on the data to be transmitted, half a data rate being a driving frequency.

3. The method as claimed in claim 1, further comprising the step of defining the predefined frequency range to essentially contain all frequencies of the output radiation which is sensed by a transducer unit.

4. The method as claimed in claim 1, further comprising the step of defining the predefined frequency range to contain only a portion of frequencies of the output radiation which is sensed by a transducer unit.

5. The method as claimed in claim 4, wherein the step of defining the predefined frequency range further comprises:

defining the frequency range to have a frequency which corresponds to the driving frequency;

defining the frequency range to exclude twice the driving frequency; and defining the frequency range to have a width of approximately 0.3 times the driving frequency.

6. The method as claimed in claim 5, wherein when the modulator is a pulse modulator, and the setpoint working point lies at either a transmission maximum value or a transmission minimum value, further comprising the step of:

regulating the average value of the control signal using a control circuit which is adjusted, without detuning, to a regulating point at which the average power within the predefined frequency range is at a minimum.

7. The method as claimed in one of claim 1, further comprising the step of defining the predefined frequency range to contain only frequencies which lie substantially below the driving frequency.

8. The method as claimed in claim 7, wherein when the modulator is a pulse modulator, and the setpoint working point lies at a transmission minimum value, further comprising the step of:

regulating the average value of the control signal using a control circuit which is adjusted, without detuning, to a regulating point at which the average power is at a maximum.

9. The method as claimed in claim 7, wherein when the modulator is a pulse modulator, and the setpoint working point lies at a transmission maximum value, further comprising the step of:

regulating the average value of the control signal using a control circuit which is adjusted, without detuning, to a regulating point at which the average power is at a minimum.

10. The method as claimed in claim 7, wherein when the modulator is a pulse modulator, and the setpoint working point lies between a transmission maximum value and a transmission minimum value, further comprising the step of:

regulating the average value of the control signal using a control circuit which is adjusted, with detuning, to a regulating point at which the average power is at a minimum value or at a maximum value.

11. The method as claimed in claim 7, wherein when the modulator is a data modulator, and the setpoint working point lies between a transmission maximum value and a transmission minimum value, further comprising the step of:

regulating the average value of the control signal using a control circuit which is adjusted, without detuning, to a regulating point which lies at an inflection of the power function.

12. The method as claimed in claim 1, further comprising the step of regulating the control signal with a control circuit which is not detuned so that the control circuit is regulated to the regulating point at the setpoint working point of the modulator.

13. The method as claimed in claim 1, further comprising the step of regulating the control signal with a control circuit which is detuned so that the control circuit is regulated to a point lying near to the regulating point at the setpoint working point of the modulator.

14. The method as claimed in claim 1, further comprising the steps of:

regulating the working point with the use of a phase-sensitive detection;

superimposing the deflection frequency on a deflection signal by one of addition and subtraction;

multiplying a signal which is dependent on the sensed power by a periodic reference signal having one of a frequency which corresponds to the deflection frequency and a frequency which is a multiple of the deflection frequency; and low-pass filtering a signal resulting from the multiplying a signal step which changes the average value of the control signal.

15. The method as claimed in claim 1, further comprising the step of generating the input radiation using one of a continuous-wave radiation source and a pulsed radiation source.

16. A drive unit for regulating the working point of a modulator, comprising:

a transducer unit which generates, as a function of an output radiation of a modulator, an output signal whose signal value is a measure of an average radiant power;

a working point deflection unit which periodically deflects the working point in accordance with a deflection frequency;

a working point regulating unit which generates a regulating signal for regulating the working point as a function of the output signal of the transducer unit and as a function of the deflection of the working point; and a setting unit which changes as a function of the regulating signal one of an average value of a modulator control signal and a signal value of an auxiliary signal which influences the average value of the control signal;

wherein the regulating unit comprises:

a low-frequency signal generator which generates an alternating signal;

a multiplication unit connected downstream of the signal generator and downstream of one of a power meter and a photo-element which is connected downstream of the bandpass filter;

a low-pass filter unit connected downstream of the multiplication unit and which transmits only signals with a frequency lying below a limiting frequency;

an integrator unit connected downstream of the low-pass filter unit and which generates at its output a signal which is proportional to a time integral of a signal at its input; and an adder unit connected downstream of the integrator unit and the signal generator which adds signal values present at its inputs.

17. The drive unit as claimed in claim 16, further comprising a bandpass filter arranged between the transducer unit and the regulating unit, the bandpass filter transmitting only signals with frequencies near a driving frequency or twice the driving frequency.

18. The drive unit as claimed in claim 16, wherein the transducer unit contains a photo-element which senses frequencies which lie below a tenth of the driving frequency.

19. The drive unit as claimed in claim 16, further comprising a subtractor unit, which subtracts the signal values at its inputs, connected downstream of the low-pass filter unit the subtractor unit being supplied with a signal which is proportional to the average value of the control signal, and wherein the integrator unit is connected downstream of the subtractor unit.

* * * * *